UNITED STATES PATENT OFFICE.

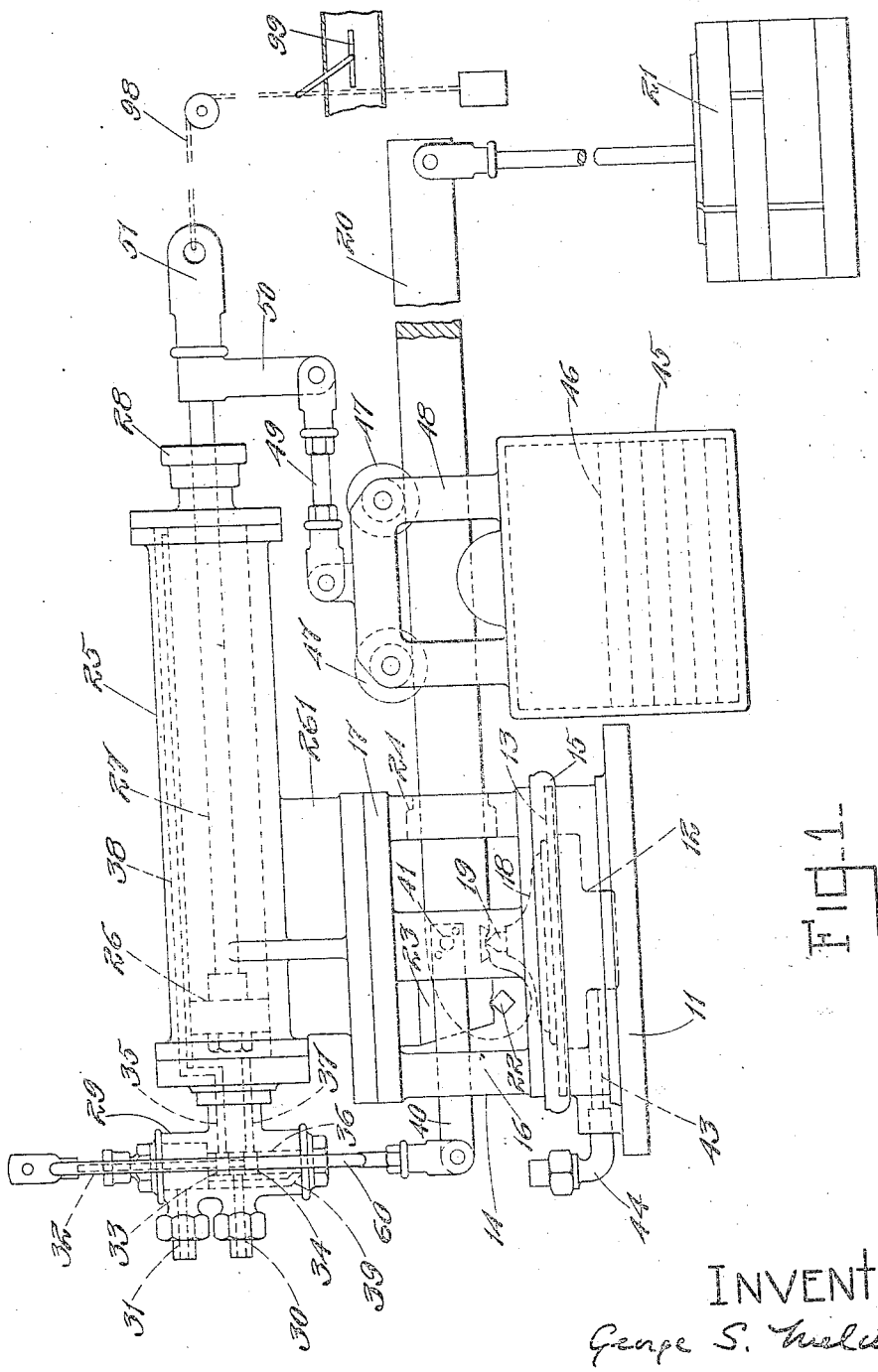

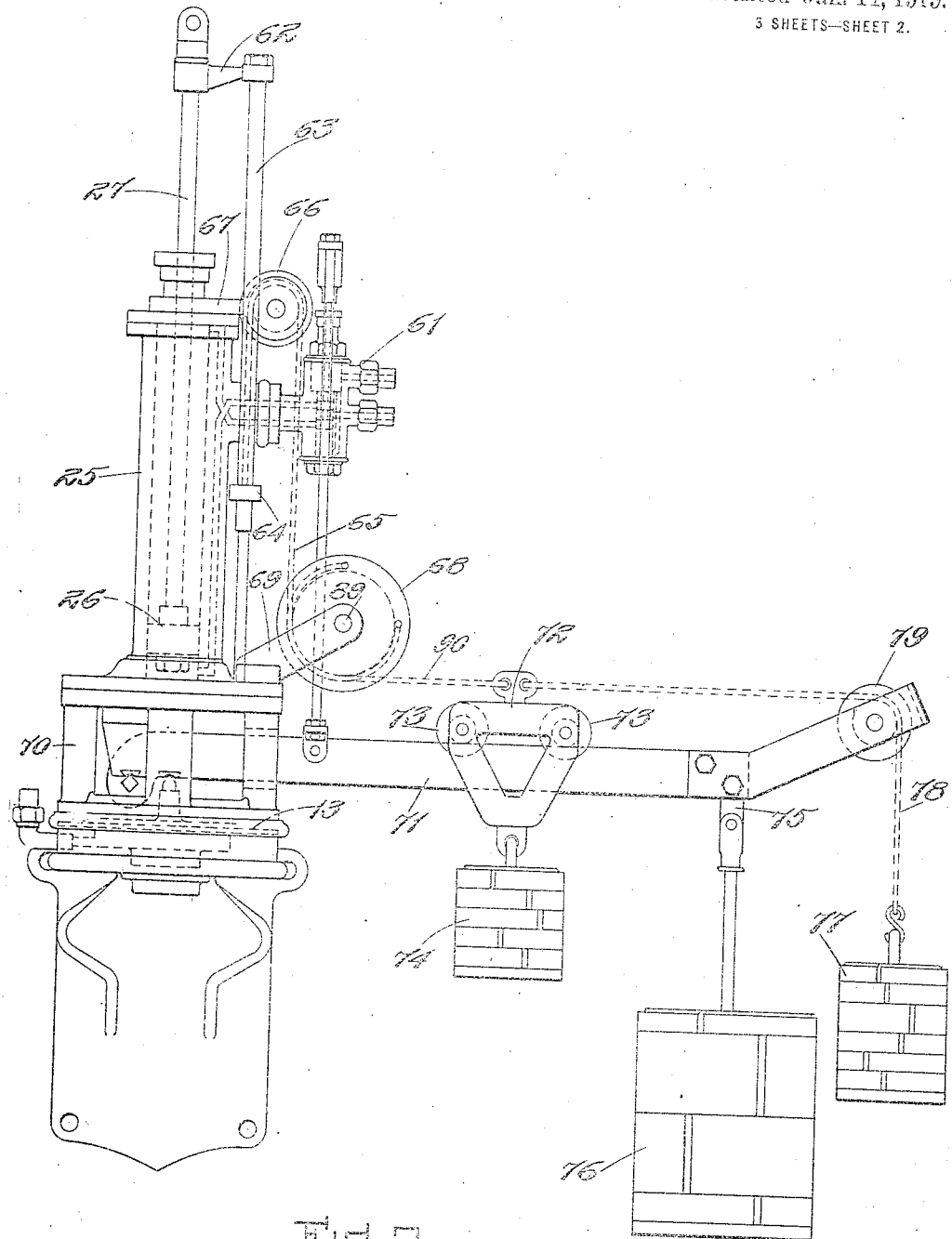

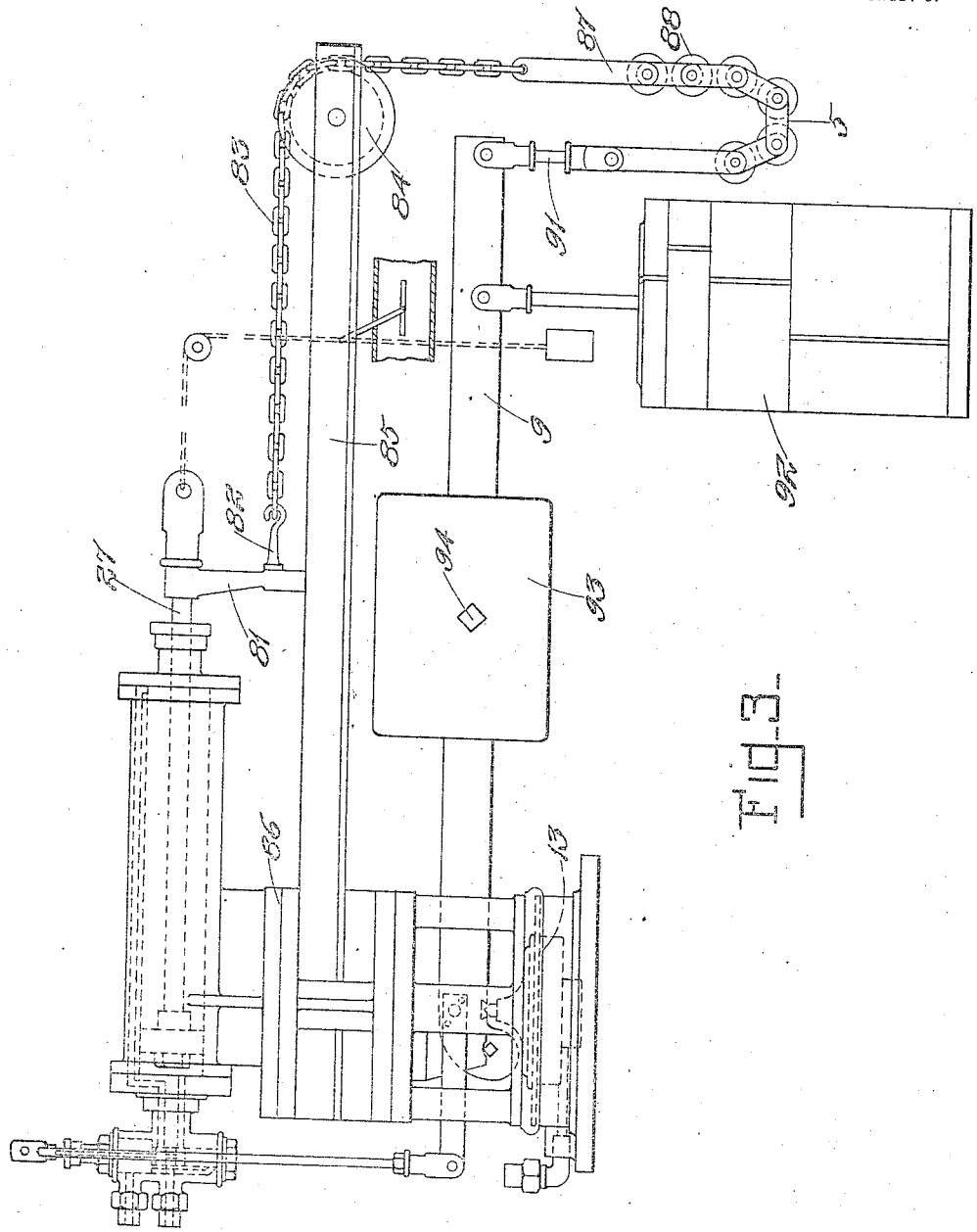

GEORGE S. MELCHER, OF SHARON, MASSACHUSETTS, ASSIGNOR TO CHARLES W. McCONNEL, OF BOSTON, MASSACHUSETTS, ELDON MACLEOD, OF WESTWOOD, MASSACHUSETTS, AND FANNIE B. LOOK, OF NORTHAMPTON, MASSACHUSETTS, TRUSTEES, DOING BUSINESS AS MASON REGULATOR COMPANY.

PRESSURE-REGULATOR.

1,291,063.   Specification of Letters Patent.   Patented Jan. 14, 1919.

Application filed August 8, 1916. Serial No. 113,817.

*To all whom it may concern:*

Be it known that I, GEORGE S. MELCHER, a citizen of the United States, residing at Sharon, county of Norfolk, State of Massachusetts, have invented a certain new and useful Improvement in Pressure-Regulators, of which the following is a specification, reference being had therein to the accompanying drawings.

My invention relates to boiler pressure regulators particularly of the hydraulic type and has for its object the automatic control of boiler pressure by means of a new and improved regulator of this type having an adjustable compensating mechanism. The compensating mechanism embodying my invention is so arranged in combination with the regulator that it will take care of any range of pressure variation so that proper compensating action is always obtained. The compensating mechanism and the regulator are so arranged and constructed that the parts are positively actuated and proper regulation is at all times insured. Furthermore, the device is compact and of comparatively simple construction so that it may be readily and inexpensively produced. The object of my invention is to provide an improved mechanism which will have a sufficient range of operation to take care of any range of pressure variation and which furthermore may be adjusted so that the range of pressure variation for which it is adapted may be varied as desired.

My invention will be fully understood when taken in connection with the accompanying drawings and the novel features thereof will be pointed out and clearly defined in the claims at the close of this specification.

In the drawings, Figure 1 is a side elevation of a device embodying my invention, a damper and connections thereto being shown diagrammatically.

Fig. 2 is a side elevation showing a modified form of device embodying my invention.

Fig. 3 is a side elevation showing another modified form of device embodying my invention, a damper and connections thereto being shown diagrammatically.

Having reference to the drawings there is shown at 11 a base having a recess 12 and provided with a diaphragm 13 of rubber or other like suitable material. The diaphragm 13 is interposed between the said base 11 and a frame 14 consisting of an annular lower member 15 which encircles the diaphragm, a plurality of uprights 16 and a top member 17 as shown. Upon the diaphragm 13 is a diaphragm button 18 provided with a knife edge 19 on which rests a lever 20 one end of which is provided with a weight 21 and the other end of which has projecting from each side a pair of squared lugs 22 only one of which is shown. Each of the lugs 22 form knife edges and engage at one of their edges with a grooved portion of the end of a forked downwardly projecting member or cricket 23 secured to the member 17 of the frame within the forked end of which member the said lever projects. One of the uprights 16 of the frame is provided with a rectangular opening 24 through which the lever 20 projects which is so arranged that it permits the lever to oscillate vertically about the lugs 22.

Above the frame 16 is a horizontal cylinder 25 mounted on a supporting base 261 which is secured to the member 17 of the frame. The cylinder 25 is provided with a piston 26 of any usual type having a stem 27 which passes through a suitable stuffing box 28 at one end of the cylinder 25. The piston 26 is adapted to be operated by any common form of fluid pressure such for example as water under pressure from a main or boiler. The fluid supply to the cylinder 25 is controlled by means of a pilot valve 29 of any suitable construction. The pilot valve shown is of the double acting type and is provided with an inlet port 30 and an exhaust port 31 through which water pressure for example may be admitted and exhausted. The valve 29 has a movable valve stem 32 having a pair of valve members 33, 34 operating in a valve passage 36 and arranged as shown. A port 35 connects the valve passage 36 with one end of the cylinder 25 by means of a passage 38 and a port 37 also connects the valve passage 36 with the other end of the cylinder 25. The pilot valve 29 contains an exhaust passage 39 shown in dotted lines which leads around the valve members 33 and 34 which control the opening and closing of the ports 30, 31, 35 and 37.

It will be seen from the drawing that when the lever 20 is horizontal, the ports 35, 37 are closed by the valve members 33 and 34. When the valve members 33 and 34 are raised, water from the inlet port 30 will be admitted to the right hand end of the cyl-inder 25 as seen in the drawings through the port 35 and passage 38 and at the same time the water in the cylinder on the other side of the piston 26 will be exhausted through the exhaust passage 39 and out through the exhaust port 31. On the other hand when the valve stem 32 is moved downwardly the action is reversed and the inlet port 30 is connected with the left hand end of the cylinder by the port 37. Under these circumstances water is exhausted from the cylinder through passage 38, port 35 and out through the exhaust passage 31 by way of the space around the valve stem 32.

The pilot valve 29 is operated by means of a lever extension member 40 rigidly secured at one end to the lever 20 at 41, the free end of which is pivotally connected with a yoke 60 which surrounds the body of the valve 29 and which is in turn pivotally connected to the valve member 32. The recess 12 beneath the diaphragm 13 is connected to the boiler pressure or other pressure to be controlled through a port 43 which communicates with a pipe 44. Whenever the pressure to be governed exceeds a predetermined amount as regulated by the weight 21 at the end of the lever 20 the diaphragm 13 will be raised from the horizontal position shown and consequently move the lever 20 and weight 21 upwardly about the lugs 22 as a pivot. Such a movement will actuate the member 32 of the valve 29 downwardly and consequently will admit pressure to the left hand end of the cylinder 25 in the manner described above and cause the piston 26 and rod 27 to be moved to the right and the damper or other controlling device to be closed shutting off the draft and reducing the pressure to be regulated. On the other hand if the pressure in the device being governed drops below the predetermined amount the weight 21 will overcome the said pressure beneath the diaphragm 13 and will consequently lift the valve member 32 and cause the piston 26 and rod 27 to be moved to the left and thereby will open the boiler damper or like controlling device so that the pressure is increased. It will be seen, however, that if the valve members 33 and 34 are given movements directly proportional to the weighted lever 20 the tendency would be to open the pilot valve wide which would result in moving the piston the extreme length of the cylinder each time that the pilot valve moved and thus would open the damper wide or close it completely with a resulting waste of fuel and greatly increased fuel consumption.

In order to insure proper compensation, I provide improved means for automatically varying the pressure on the diaphragm so that any change in pressure beneath the diaphragm is met by a corresponding resistance to that pressure above the diaphragm so that the parts are returned to balance. This is accomplished by providing a weight holder 45 having any desired number of weights 46 which is supported on rollers 47 journaled in a hanger 48 which is in turn secured to the holder 45. The rollers 47 are arranged to run on the lever 20 so that the holder 45 may be moved lengthwise of the lever. The holder 45 is connected to the outer end of the piston rod 27 by means of a link 49 pivoted at one end to the hanger 48 and at the other end to an arm 50 secured to the piston rod 27. At 51 is shown a jaw which is fast on the rod 27 and adapted to be connected with a damper chain 98 in connection with a damper 99 or other pressure controlling device.

It will be seen from the above that if pressure beneath the diaphragm 13 increases for example, and the piston rod 27 is accordingly moved outwardly and consequently starts to close the flue damper 99 in the boiler to check the draft, the weight receptacle 45 will also be moved outwardly on the lever 20 and on account of the greater leverage will add additional resistance to the resistance already subjected to the upper surface of the diaphragm 13 by the weight 21. The diaphragm 13, therefore, will immediately be forced downwardly again so that the member 32 of the pilot valve 29 will be raised and the pilot valve closed thereby preventing any further entrance of water into the cylinder 25. In this manner the piston rod 27 will be held in the position given and the damper or other controlling device will also be prevented from further movement until a further change in initial pressure takes place. If the position of the damper is not such as to check the draft sufficiently to prevent a still further increase in boiler pressure, the diaphragm 13 will again cause the piston rod 27 to be moved still farther outwardly together with the weight 45. The piston rod 27 will again be checked and the damper held in its new position. If the initial pressure decreases the piston rod will be moved inwardly and the damper checked by means of the weight 45 which will be moved inwardly on the lever 20 thereby lessening the resistance. It will be seen from the above that the damper movement is graduated and only sufficient to give the proper amount of damper opening to effect the desired rate of combustion. Furthermore, it will be noted that the range of pressure variation to which the device is adapted is not limited as in devices as heretofore constructed so far as known to me, namely, by the limit of movement of the diaphragm but the device may be adjusted by varying the weight of the holder 45 so as to cover any desired range of pressure variation.

Fig. 2 of the drawings shows a modified form of device embodying my invention in which an upright damper regulator is provided with a compensating device operating on the principle described above. In this device the cylinder 25 has the usual piston rod 27 which is arranged to close the flue damper when it moves outwardly and to open it when it moves inwardly in the same manner as the device shown in Fig. 1. The pilot valve 61 is connected at one side of the cylinder 25 and arranged to operate the piston 26 so that it moves outwardly with a rise in pressure and vice versa as is the case with the device described above. The piston rod 27 is provided with an arm 62 which is in turn secured to a rod 63 having near its lower end an arm 64 to which is secured a belt or chain 65. The belt or chain 65 passes upwardly over a pulley 66 journaled to a support 67 on the cylinder 25 and downwardly around one of a pair of pulleys 68 rigidly attached to a shaft 89 journaled to a bracket 69 secured to the base 70 of the device, to which pulley the said chain is secured. A chain 90 is secured at one end to the other of the said pulleys 68 and at the other end to a weight carriage 72. The weight carriage 72 travels on rollers 73 adapted to run upon the lever 71 and at its lower end is arranged to support a plurality of weights 74. At 75 the lever 71 is provided with the usual weight 76 which may be varied according to the pressure desired. When the pressure in the boiler decreases the piston rod 27 moves inwardly and opens the damper. At the same time the belt 65 pulls the weight 74 inwardly on the lever thereby reducing the pressure exerted on the diaphragm until the parts are again brought to balance. In order to move the weights 74 outwardly on the lever when the piston rod 27 is moved outwardly owing to an increase in pressure, I provide a weight 77 which is suspended on a cord 78 passing over a pulley 79 journaled to an upwardly extending end portion of the lever 71 and thence passing along the lever 71 to the carriage 72 to which it is secured. While I preferably use the construction shown I do not wish to limit myself to this particular form for instead of the weights 77, I may employ a spring or like device for moving the weight outwardly on the lever 71.

Fig. 3 of the drawings shows still another form of device by which the resistance to the pressure beneath the diaphragm 13 may be varied. In this device the piston rod 27 is provided with an arm 81 having a hook 82 to which is secured a chain 83 which passes over a pulley 84 journaled in a support 85 secured to the body 86 of the device and thence passes downwardly to a weight chain 87. The chain 87 is composed of a plurality of weights 88 secured together by links 5 and arranged with one end secured to the chain 83 and the other secured to the end of the weight lever 9 by means of a link connection 91. The lever 9 is provided with the usual weight 92 and additional sliding weight 93 which latter weight is not essential to the operation of the device but which forms a convenient means for making a ready and quick adjustment. The weight 93 is loosely mounted upon the lever 9 and is secured to it by a set screw 94.

The device just described operates similarly to the devices hereinabove described. When the rod 27 moves outwardly the damper is closed and additional weight is added to the weighted lever 9, the support of some of the weights 88 being transferred to the lever 9 and taken off the chain 83. In this manner a movement of the piston rod serves to vary the resistance to the pressure beneath the diaphragm so that a graduated movement is obtained.

While I have shown the device employed in connection with a furnace damper, I wish it to be understood that I do not limit myself to this type of pressure control for the device may equally well be employed in connection with any other form of boiler or other pressure controlling devices such as a rheostat pressure valve or the like.

What I claim is:

1. In a regulator, in combination with a diaphragm which is subjected on one side to initial pressure, a lever which acts on the other side of the diaphragm to resist the initial pressure, a cylinder having a double acting piston with a stem projecting from one end thereof, a pilot valve which controls the entrance of fluid to either side of said piston, said pilot valve having a stem, said lever having laterally projecting lugs, a frame, a yoke attached to said frame and straddling said lever in such manner that the said lugs of the lever engage said yoke as a fulcrum, said lever having an extension member rigidly connected therewith, a pivot connection between said extension member of the lever and the stem of said pilot valve, a weight mounted on said lever and movable with relation thereto, and means connecting said weight with the stem of said piston, so constructed and arranged that the movement of the piston in one direction causes the movement of said weight in relation to the lever.

2. In a regulator, in combination with a diaphragm which is subjected on one side to initial pressure, a lever which acts on the other side of the diaphragm to resist the initial pressure, a cylinder the axis of which is above and parallel to the said lever, a piston in the said cylinder, a pilot valve which controls the entrance of fluid to said cylinder to actuate said piston, said pilot valve having a stem, a connection between said stem and said lever, a weight carriage slidably mounted on said lever and movable thereon in a line substantially parallel with the line of travel of the piston, a weight supported by said carriage, an arm extending from said piston, and a link connecting said arm and said weight carriage so that movement of the piston will cause the weight to travel lengthwise of the lever.

In testimony whereof I affix my signature, in presence of a witness.

GEORGE S. MELCHER.

Witness:
 ALICE H. MORRISON.